June 28, 1927.
C. H. SEMPLE
1,634,160
PROCESS OF MANUFACTURING INNER TUBES
Filed Dec. 23, 1924     2 Sheets-Sheet 1
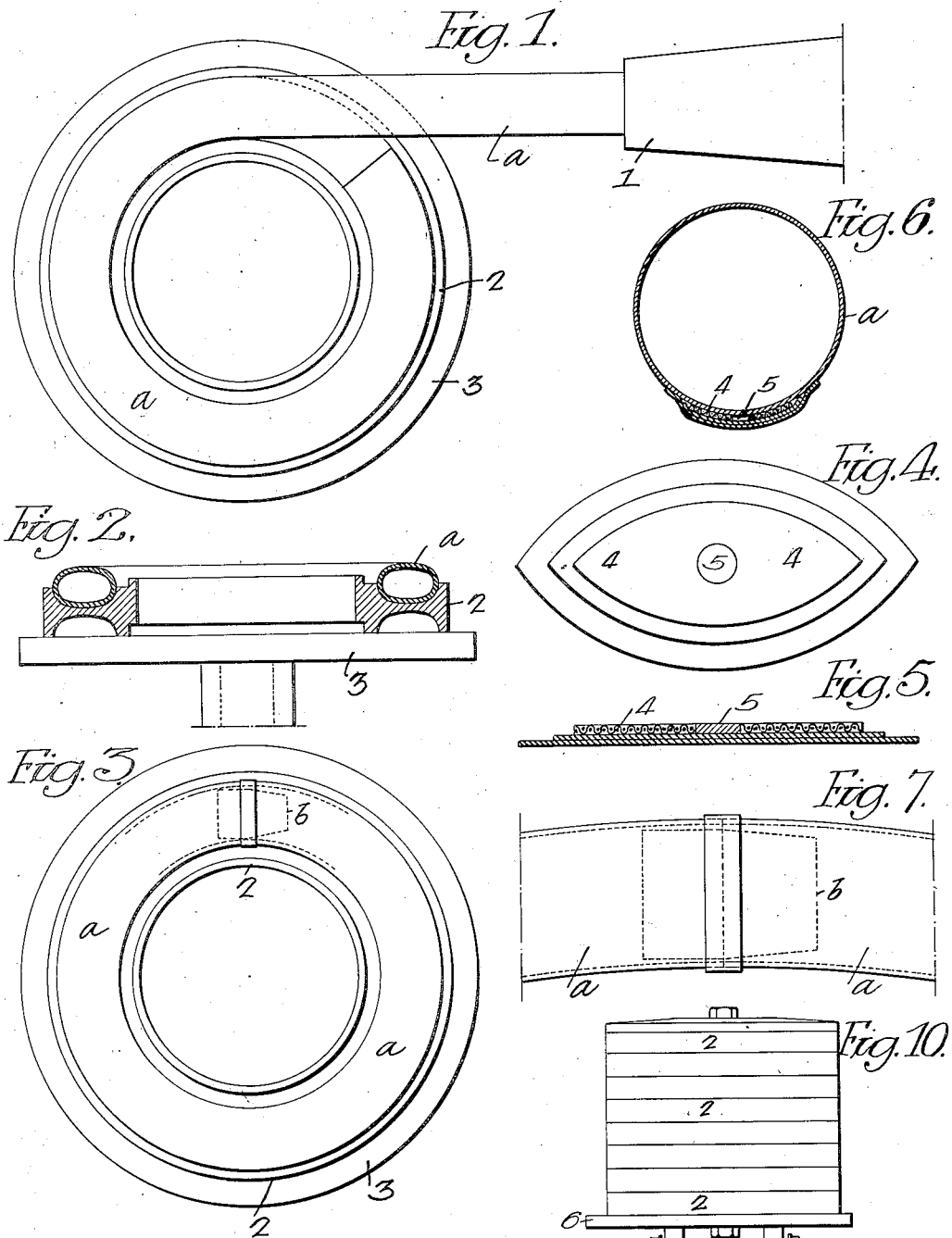

June 28, 1927.
C. H. SEMPLE
1,634,160
PROCESS OF MANUFACTURING INNER TUBES
Filed Dec. 23. 1924
2 Sheets-Sheet 2
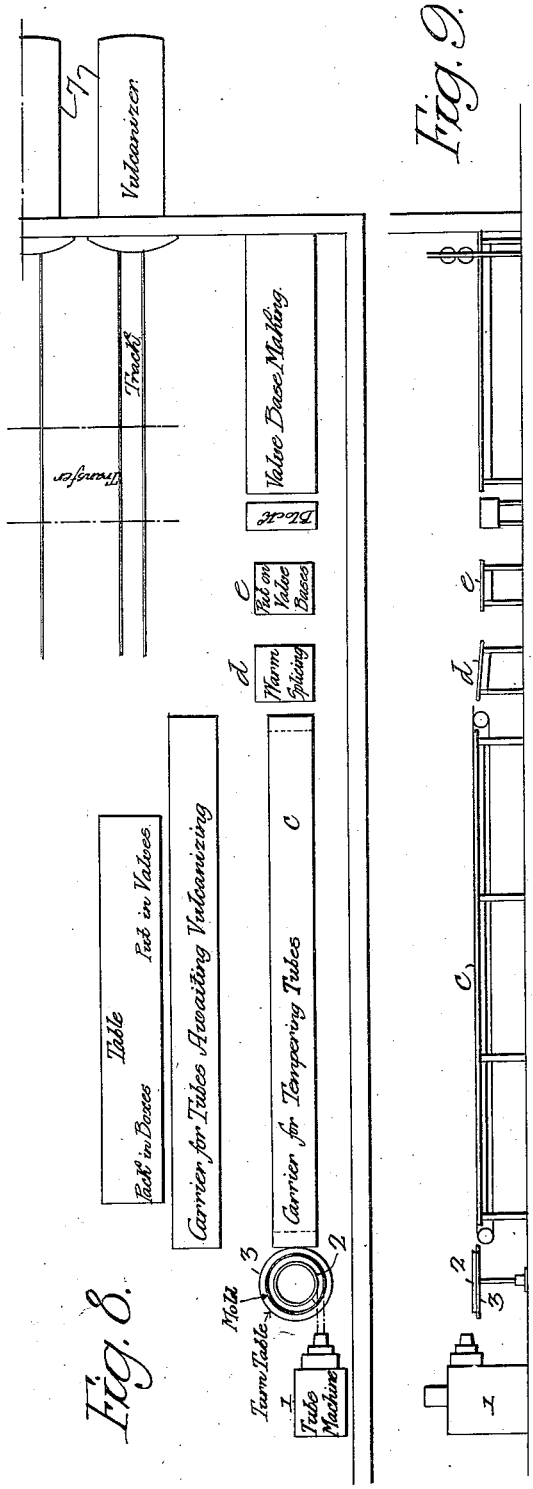
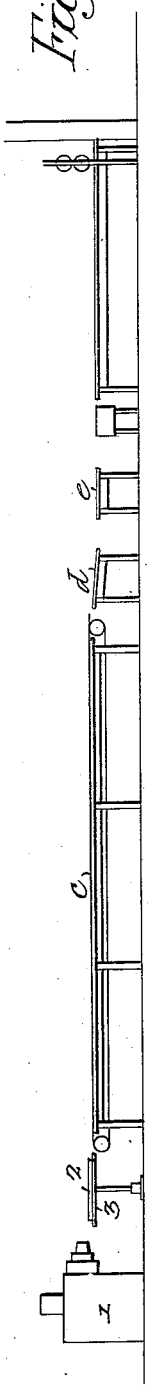
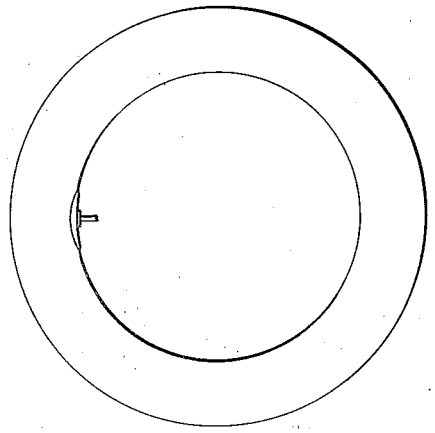

Patented June 28, 1927.

1,634,160

UNITED STATES PATENT OFFICE.

CHARLES HERBERT SEMPLE, OF YOUNGSTOWN, OHIO, ASSIGNOR, BY DIRECT AND MESNE ASSIGNMENTS, TO SEMPLE-LEE PROCESSES, INC., OF AKRON, OHIO, A CORPORATION OF DELAWARE.

PROCESS OF MANUFACTURING INNER TUBES.

Application filed December 23, 1924. Serial No. 757,693.

This invention relates to the art of making annular rubber tubes such as inner tubes for tires and its chief object is to provide improved procedure whereby tube stock, and especially stock extruded from a tubing machine, may be rapidly and economically formed into endless tubes, vulcanized, and made ready for service.

More specific objects are to lessen the number of steps necessary for making the tube, as by cutting the stock to length as it emerges in a warm, plastic and unvulcanized condition from a tubing machine and forming each length into an annular tube without any intervening step of semi-curing the tube upon a mandrel; to provide for the vulcanization of a large number of tubes at the same time in a vulcanizer of given size; and to provide a finished tube of desirable cross-sectional form and with desirable uniformity of wall thickness.

This object I attain in the following manner, reference being had to the accompanying drawings, in which:

Fig. 1 is a diagrammatic view showing a tube being placed in a mold as it comes from any ordinary tubing machine;

Fig. 2 is a sectional view on the line 2—2, Fig. 1;

Fig. 3 is a sectional view of the tube mold, with a tube in position to have the ends joined and the valve reinforcement put in place;

Fig. 4 is a diagrammatic view of the valve reinforcement;

Fig. 5 is a sectional view of the valve reinforcement;

Fig. 6 is a sectional view of the valve reinforcement after it has been attached to a tube;

Fig. 7 is a view showing one form of joint, or splice, of the tube ends;

Fig. 8 is a plan view showing the steps in the work of producing tubes by my improved process;

Fig. 9 is a view, in elevation, of the apparatus shown in Fig. 8;

Fig. 10 is a sectional view illustrating a series of tube molds mounted on a vulcanizer car, one above another, and secured together, with the rubber tubes therein prior to being vulcanized; and Fig. 11 is a view of a finished tube.

Referring to the drawings, 1 is the discharge nozzle of a tubing machine. 2 is a mold, so located as to receive the hot rubber tube $a$ as it comes from the tubing machine, as shown in Fig. 1. The mold is mounted, preferably on a rotatable table 3, Fig. 2. The unvulcanized rubber is placed in the tubing machine in the ordinary manner and is projected from the tubing machine in the form of a tube, which is directed at once, and while hot, into a circular mold of the proper diameter. This may be the vulcanizing mold for the inner tube, or a temporary form. In some instances, it may be a piece of flat material with a guide to indicate the correct diameter.

The tube is cut off the exact length from the tubular material coming from the tubing machine, and, the mold, or form, is placed on the carrier $c$, Fig. 8. Another mold, or form, is placed on the table 3, and the operation is repeated.

The carrier $c$, Fig. 8, travels in harmony with the speed of the discharge of rubber from the tubing machine so that, when one complete tube has been discharged from the tubing machine, there is sufficient space on the end of the carrier next to the tubing machine to receive the mold, or form, just filled. The object of this is to cool, or temper, the stock so that it will be of the right temperature to be handled most advantageously when it reaches the warm splicing table $d$, Fig. 8.

The operator stationed on the carrier $c$ places into the tube the proper amount of water, ammonia, or other inflatant, before passing it to the operator at the warm splicing table $d$.

The ends may be joined by telescoping, but I prefer to make the joint by cutting off squarely each end of the circular tube, Fig. 7, inserting a guide A, which is preferably made of soft, bulky paper, or straw board, and which is preferably tapered at one end. This guide serves the purpose of preventing the unvulcanized rubber adhering within the tube after it has been washed with high test naphtha, or benzol, and facilitates the entire operation.

After the ends of a tube have been washed and brought together over a guide, they adhere at once, making a perfect union. The outer surface around the joint is then washed and a strip of unvulcanized rubber is wrapped around it. During the vulcanization, this strip of rubber and the rubber of the inner tube are formed into a homogeneous piece of rubber so that there is no chance for air leakage.

From the splicing table, the tube is passed to table e, Fig. 8, where the valve reinforcement 4, Figs. 4 and 5, is put in place. The valve may be attached to this reinforcement, in which case—if desired—the inflation of the inner tube against the walls of the mold may be made with air, instead of water, ammonia, or other inflatant.

A hole of correct size to receive the valve-stem of the inner tube is punched in the fabric of the valve reinforcement 4 and in this hole, when the tube is to be vulcanized while distended by a sealed-in inflatant, is placed a metal disk, or plug, 5, Fig. 5, which is easily broken out when vulcanization is completed, thereby making it possible to insert the valve.

Molds for this work should be light so that they can be handled easily, therefore, aluminum meets this requirement. The mold, Fig. 2, is made with an inner annular rib, which extends upwardly to engage and register with the mold above it. The under side of one mold forms the top of the mold below it, with the exception of the first and last molds, which are made one-sided for economy of space.

The molds may be placed in the vulcanizer in any desired number, from one to the capacity limit of the vulcanizer.

The molds are placed, preferably, one on top of another on a car 6, after which they are firmly bolted, or clamped, together. The car is run into the vulcanizer 7 and live steam is turned on to effect the vulcanization. In some cases, a vertical vulcanizer may be used instead of the horizontal vulcanizer described and the molds may be clamped together by hydraulic pressure.

When the tubes are taken from the vulcanizer and the valves are attached, they are ready to be packed and delivered to the shipping room.

It is unnecessary to inflate, test and deflate the tubes, as a leak in a tube will prevent it from expanding during vulcanization and the defect is evident as soon as a mold is opened.

The molds preferably are of such form as to define mold cavities of oblate cross-sectional form as shown, with a less maximum dimension in an axial than in a radial direction, so that a large number of tubes may be assembled in a stack of molds of given length or height, and so that the finished tube may have an outside diameter greater than the outer diameter of the tire cavity which it is to occupy and an inner diameter less than the inner diameter of the said tire cavity, and thus be adapted to be readily inserted in the tire, to fit snugly and without slack material at the beads of the tire and to have rubber in its tread portion put under compression, for puncture proof purposes, as an incident of its change of shape upon inflation. Such a tube is described in my copending application Ser. No. 85,735, filed February 3, 1926. Notwithstanding the great difference between the outer and inner peripheral lengths of such a tube, I find that it can be formed by the above-described method without undesirable wrinkling or thickening of its inner peripheral walls or excessive thinning of its tread portion.

The method hereinbefore described for joining the ends of the tube forms the subject of a separate application for patent, Ser. No. 757,691, filed even date herewith. The mold hereinbefore described also forms the subject of a separate application for patent, Ser. No. 757,692, filed even date herewith.

I claim:

1. The method of making collapsible endless rubber tubes which comprises shaping hot rubber stock into a continuous tube of closed cross-sectional form, bending the tube in such cross-sectional form to approximately its final condition of longitudinal curvature before substantial cooling of the tube, the tube being bent by uniform progression of external bending forces along the tube without full-section internal support of the tube in the region of such forces, cutting successive lengths from the curved portion of the continuous tube, joining together the two ends of respective lengths, and vulcanizing the resulting endless tubes under internal fluid pressure.

2. A method as defined in claim 1 in which the length of the tube before its ends are joined is given a cross-sectional form such that it is appreciably more extensive in a radial than in an axial direction and in which the endless tube is vulcanized in that form in a mold.

3. The method of making collapsible endless rubber tubes which comprises shaping rubber stock into a continuous tube of closed cross-sectional form, bending the tube in such cross-sectional form to approximately its final condition of longitudinal curvature, the tube being bent by uniform progression of external bending forces along the tube without full-section internal support of the tube in the region of such forces, cutting successive lengths from the curved portion of the continuous tube, joining together the two ends of each length, and vulcanizing the resulting endless tubes under internal fluid pressure.

4. A method as defined in claim 3 in which the length of the tube before its ends are joined is given a cross-sectional form such that it is appreciably more extensive in a radial than in an axial direction and in which the endless tube is vulcanized in that form in a mold.

CHARLES HERBERT SEMPLE.